(12) United States Patent
Mansell

(10) Patent No.: US 12,479,080 B2
(45) Date of Patent: Nov. 25, 2025

(54) CLAMPING DEVICE FOR AFFIXING ACCESSORIES

(71) Applicant: Michael Allen Mansell, Tucson, AZ (US)

(72) Inventor: Michael Allen Mansell, Tucson, AZ (US)

(*) Notice: Subject to any disclaimer, the term of this patent is extended or adjusted under 35 U.S.C. 154(b) by 88 days.

(21) Appl. No.: 18/305,486

(22) Filed: Apr. 24, 2023

(65) Prior Publication Data
US 2023/0347494 A1 Nov. 2, 2023

Related U.S. Application Data

(60) Provisional application No. 63/335,296, filed on Apr. 27, 2022.

(51) Int. Cl.
*B25F 5/02* (2006.01)
*F16B 1/00* (2006.01)
*F16B 2/12* (2006.01)
*F21V 23/04* (2006.01)
*F21V 33/00* (2006.01)

(52) U.S. Cl.
CPC ............... *B25F 5/023* (2013.01); *F16B 1/00* (2013.01); *F16B 2/12* (2013.01); *F21V 23/04* (2013.01); *F21V 33/0084* (2013.01); *F16B 2200/83* (2023.08)

(58) Field of Classification Search
CPC .... B25F 5/023; F16B 1/00; F16B 2/12; F16B 2200/83; F21V 23/04; F21V 33/0084
See application file for complete search history.

(56) References Cited

U.S. PATENT DOCUMENTS

| | | | | |
|---|---|---|---|---|
| 4,508,221 A | * | 4/1985 | Olson | B25F 5/029 206/478 |
| 4,797,040 A | * | 1/1989 | Hibbard | B25B 23/00 248/205.2 |
| 5,056,661 A | * | 10/1991 | Balzano | B25F 5/029 D3/304 |
| 5,797,670 A | * | 8/1998 | Snoke | B25F 5/029 24/270 |
| 5,810,525 A | * | 9/1998 | Ector, Sr. | B25F 5/029 81/177.4 |
| 5,842,584 A | * | 12/1998 | Baird | B25F 5/029 224/901.4 |
| 6,370,741 B1 | * | 4/2002 | Lu | A47B 21/045 24/523 |
| 6,729,480 B1 | * | 5/2004 | Blake | B25F 5/006 211/69.1 |
| 6,729,743 B2 | * | 5/2004 | Gillette | B25B 23/18 362/253 |

(Continued)

*Primary Examiner* — Terrell L McKinnon
*Assistant Examiner* — Ding Y Tan
(74) *Attorney, Agent, or Firm* — Merchant & Gould P.C.

(57) ABSTRACT

An example device that may be mounted to a tool may include a clamping mechanism that allows the device to be put onto a tool and removed from the tool. The device may affix pieces and accessories by using an accessory fastening mechanism, such as one or more magnets. This device may include various features on a permanent or temporary basis. Such features may include lights, speakers, levels, or other features. In an example, the device may be used with a handheld tool, such as a power drill or other tool.

14 Claims, 13 Drawing Sheets

(56) References Cited

U.S. PATENT DOCUMENTS

| | | | | |
|---|---|---|---|---|
| 6,964,545 | B1* | 11/2005 | Languasco | B25F 5/029 362/120 |
| 7,621,396 | B1* | 11/2009 | Flores | B25F 5/029 206/443 |
| 8,066,268 | B2* | 11/2011 | Brauer | B25F 5/029 269/130 |
| 9,701,008 | B2* | 7/2017 | Cho | B25F 5/029 |
| 12,011,820 | B2* | 6/2024 | Moss | B25B 21/00 |
| 12,023,795 | B1* | 7/2024 | Yaski | B25F 5/029 |
| 2002/0054798 | A1* | 5/2002 | Dils | G01V 3/15 408/124 |
| 2002/0101311 | A1* | 8/2002 | May, III | B25B 11/002 335/205 |
| 2004/0206649 | A1* | 10/2004 | Chen | B25F 5/029 206/379 |
| 2007/0059114 | A1* | 3/2007 | Grimes | B25F 5/029 224/183 |
| 2011/0266321 | A1* | 11/2011 | Hsueh | B62J 11/00 224/448 |
| 2020/0055176 | A1* | 2/2020 | Curchod | B25B 21/007 |
| 2021/0237253 | A1* | 8/2021 | Moss | B25B 21/00 |
| 2022/0250229 | A1* | 8/2022 | Hampton | B25F 5/029 |
| 2022/0288769 | A1* | 9/2022 | Zolno | B25F 5/00 |
| 2023/0117562 | A1* | 4/2023 | Nooner | B25H 3/003 248/542 |
| 2023/0263280 | A1* | 8/2023 | Lin | A45C 11/00 248/274.1 |

* cited by examiner

CLAMPING DEVICE FOR AFFIXING ACCESSORIES

RELATED APPLICATIONS

This application claims priority to U.S. Provisional Patent Application No. 63/335,296 filed on Apr. 27, 2022, which is hereby incorporated by reference in its entirety.

BACKGROUND

When using a tool, there may be a need to access screws, bits, nails, or other pieces that complement the tool. A user may need to store such pieces in places that may be difficult to access, or the user may need to forgo having easy access to such pieces.

SUMMARY

Aspects of the present disclosure relate to a device that may be attached to a tool using a clamping mechanism. Opening the clamping mechanism may expand an interior portion of the device. A portion of the tool may be placed in the interior portion of the device. Closing the clamping mechanism may cause the device to clamp the portion of the tool. Various pieces or accessories for the tool may be attached to the device. In some instances, the device may use magnets to affix accessories.

In a first aspect, a device for storing a tool accessory is disclosed. The device comprises a housing defining an interior portion; a clamping mechanism; and a magnet attached to the housing, the magnet being configured to affix an accessory to an exterior surface of the device; wherein the housing includes an open bottom portion; wherein the interior portion is configured to receive, via the open bottom portion of the housing, a portion of a tool; wherein the clamping mechanism, when opened, causes the interior portion of the housing to expand; and wherein the clamping mechanism, when closed, causes the interior portion to contract and causes the device to clamp onto the portion of the tool.

In a second aspect, a device for affixing and storing pieces is disclosed. The device comprises an interior portion defined at least in part by curved sides of the device; an open bottom portion leading to the interior portion; a clamping mechanism including a tension-producing part; a first magnet configured to affix at least one of the pieces to an exterior top of the device; and a second magnet configured to affix at least one of the pieces to an exterior side of the device; wherein opening the clamping mechanism causes the interior portion to expand; wherein closing the clamping mechanism causes the device to clamp onto a portion of a tool.

In a third aspect, a method of using a device for affixing accessories is disclosed. The method comprises opening a clamping mechanism of the device to expand an interior portion of the device; placing the device onto a first tool so that at least a portion of the first tool is disposed within the interior portion; closing the clamping mechanism to contract the interior portion and to cause the device to clamp to the portion of the first tool disposed within the interior portion; affixing, using an accessory fastening mechanism of the device, an accessory to an exterior of the device; opening the clamping mechanism to expand the interior portion and to cause the device to release the portion of the first tool disposed with the interior portion; removing the device from the first tool; placing the device onto a second tool so that at least a portion of the second tool is disposed within the interior portion; and closing the clamping mechanism to contract the interior portion and to cause the device to clamp to the portion of the second tool.

BRIEF DESCRIPTION OF THE DRAWINGS

Some illustrations of the present disclosure are presented here but the present disclosure is not limited to just these embodiments or examples.

DETAILED DESCRIPTION

Figure 1:
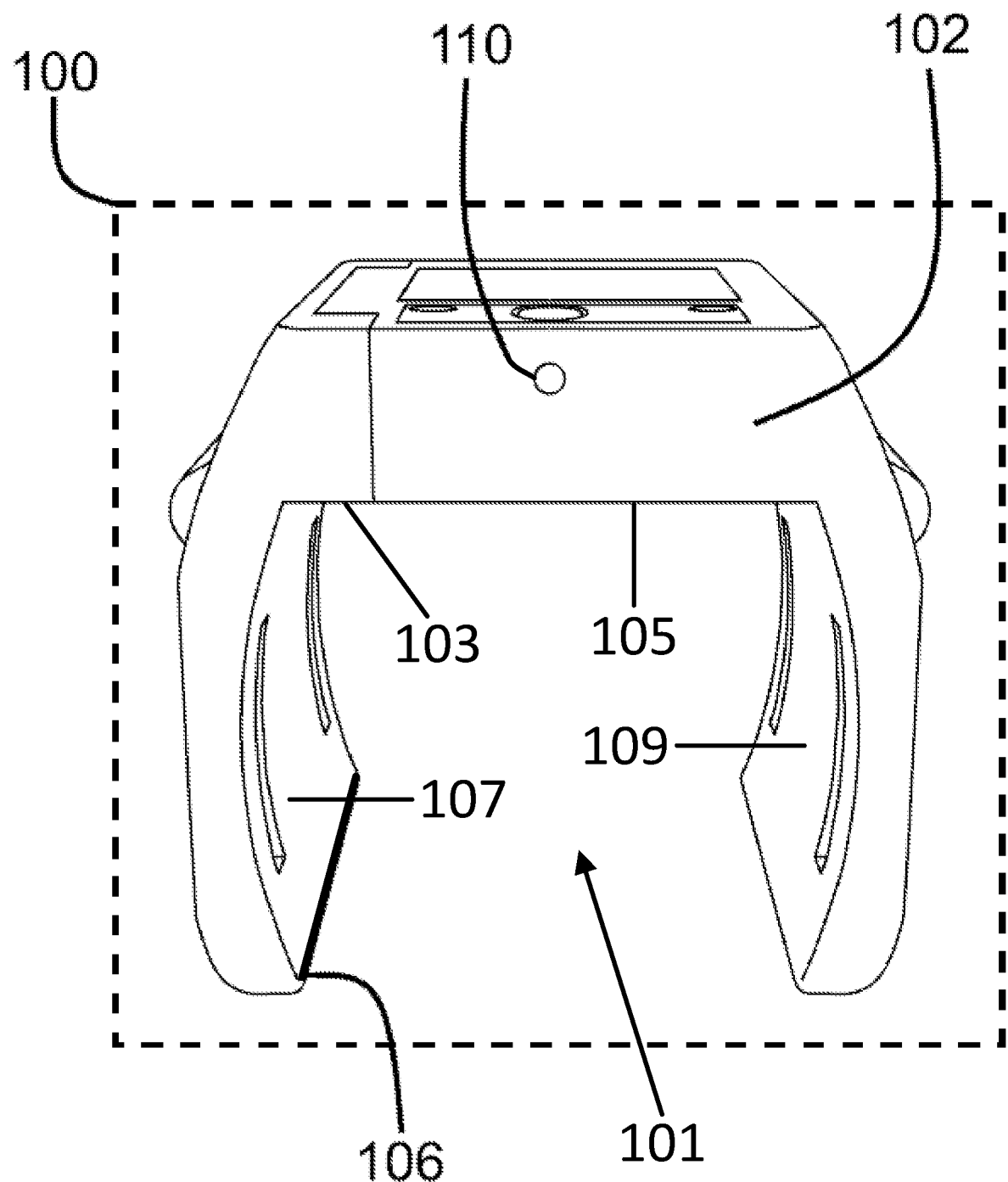
FIG. 1 illustrates a front view of an example embodiment of a device.

The terminology used herein is for the purpose of describing particular embodiments only and is not intended to be limiting of the disclosure. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms including technical and scientific terms used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

For the purposes of this document, the term tool or tools is meant to describe any tool. This includes powered and unpowered handheld tools. This includes benchtop tools. This includes but is not limited to battery powered and plug in powered tools. Although a battery powered drill is used in the Figures, this is provided solely for illustrative purposes. The device could be used on many other tools in a similar manner.

For the purposes of this document, the term magnet or magnets is meant to include the possibility of permanent as well as electromagnets. In some embodiments permanent magnets would be appropriate since no energy is needed to power them. In some embodiments, electromagnets would be appropriate since the user will want to have the option to turn off the magnetic properties at times. The downside is that the electromagnets will consume energy. This energy could come from a battery, rechargeable battery, capacitor or even the tool's battery among other sources.

In describing aspects of the present disclosure, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the disclosure.

It is understood that the drawings contained within the various Figures may not be to scale and are not to be construed to be any specific or certain length, width, height, or circumference. The required thickness of a material is not to be insinuated by the width of its representation within the drawings. If a certain dimension is required, then it will be spelled out within the description below.

Aspects of the present disclosure relate to a device with a clamping mechanism that is designed to attach the device to a tool. In some embodiments, the device may have magnets embedded in its walls so as to secure various metal accessories for the tool—such as drill bits, screws, etc.—to the outside of the device. In some embodiments, other features such as a light, level, laser, or other feature may be integrated into the device for additional functionality.

In some embodiments, the clamping mechanism of the device includes a tension-producing part that causes the device to press against the body of the tool being attached to. In some embodiments, the tension-producing part may be a single solid piece that is stiff enough to firmly clamp onto the body of the tool and yet flexible enough to be removable. In some embodiments, no screws or adhesives are needed to clamp the device to the tool, as friction alone be sufficient to hold the device in place until such time that the user desires to remove the device from the tool.

In another embodiment, the tension producing part may be a spring-loaded mechanism. Depending on the embodiment, the spring-loaded mechanism may take various forms. For example, the spring-loaded mechanism may include a sliding mechanism, a scissor-type mechanism, or a hinged lever. In examples, the spring may provide the tension needed for a friction hold on the tool while also allowing the tool to be removed. In some embodiment, the tension-producing part may be a hinge mechanism with a simple clasp. The clasp may keep the device in the friction hold position until the user desires to remove the device. In some embodiments, the clasp or any of the previously mentioned mechanisms could be released via a button, strap, clip, or other such holding part.

In some embodiments, the device may include a mechanism for affixing accessories to the device. In some embodiments, the device may include one or more magnets embedded in it to hold various tool accessories. These magnets may, in some embodiments, be embedded in any or all sides of the device. In some embodiments, the magnets may be exposed to the outside of the device, embedded within the material making up the structure or housing of the device, or covered with various materials such as leather, rubber, silicon, paint, etc. In some embodiments, the shape of one or more magnets may vary. In some embodiments, one or more of the magnets may have flat surfaces. In some embodiments, one or more of the magnets may have a concave shape. Such a concave shape may help keep cylindrical objects such as screws towards the center of the magnet. In some embodiments, one or more of the magnets may have ridges or channels to hold various objects. Various materials overlaying or deposited onto the magnets' surface may also, in some embodiments, provide similar benefits.

In some embodiments, a magnet embedded in the device may be used for temporarily storing the tool to which it is attached. In such embodiments, the tool with the attached device could be placed close to a shelf, wall, cabinet or other object or structure with ferrous metal. A magnet embedded in the device would then be attracted to that ferrous metal and cling to it. The friction hold of the device to the tool may then keep the tool stored at that location until the user desires to move it. Likewise, the device itself—without being attached to a tool—could be affixed to a shelf, wall, cabinet or other object or structure with ferrous metal, thereby storing the device. In some embodiments, the magnet used to store the device or the tool may be one of the magnets used to hold accessories. In some embodiments, the magnet used to store the device or tool may be a different magnet than those used to store accessories.

In some embodiments, the device may—instead of or in addition to magnets—have one or more other mechanisms for affixing accessories to the device. For example, the device may include Velcro, a sticky surface, or a suction surface. As another example, the device may include mounting rails designed for adding other accessories that could be of benefit to the user of the tool to which the device is attached. In some embodiments, the device may include integrated accessories or features. These may include, but are not limited to, lighting, speakers, lasers, or levels.

In some embodiments, the integrated accessories may include battery-operated accessories such an LED light or Bluetooth speaker. These battery-operated accessories could be powered by a removable battery, a rechargeable battery or capacitor, or from the power tool's battery. In some embodiments, these accessories may be coupled with buttons, switches, slides, etc. to control their operation. In some embodiments one or more of the accessories may be permanently embedded in the device. In some embodiments one or more of the accessories may be temporarily attached to the device, thereby allowing accessories to be added or removed as needed. As a result, a user may customize the device according to the user's preferences or according to the needs of a project.

In some embodiments, an LED light is embedded in the front-facing side of the device. The LED may be coupled with an embedded battery and a single push switch on the top-facing side. The push switch may be used to turn on or off the LED light. In some embodiments, the light switch may be mounted in such a way that when the top of the device is pressed against a surface—such as when being stored using a magnet, as mentioned previously—then the light is off, but when the top of the device is no longer pressing against that surface, the light automatically turns on.

In some embodiments, one or more levels may be integrated into the device. The one or more levels may include a bullseye level, a horizontal level, or a laser level, among other types. In some embodiments, the bullseye level could be implemented on the back side of the device for keeping a power drill in a proper vertical position when needed. In some embodiments, a common horizontal level could be useful on the side of the device for keeping a power drill in a proper horizontal orientation when needed. In some embodiments, one or more of the levels may be designed to be removable.

In some embodiments, one or more bags could be accessories for the device. These bags could be used for various projects. For example, a user could have one bag with parts for a cabinet project and another bag for a picture hanging project. The bags could be stored separately from the device or with it. When needed, the user could then just confirm that they have the correct bag with the needed parts for the appropriate project. In some embodiments, one or more of the bags may be affixed to the device. For example, the bag may include ferrous metal that may be attached to a magnet, or a bag may include means for clipping, tying, or otherwise attaching to part of the device, such as a slit of the device. In some embodiments, a cup, basket, or other form may be used instead of a bag or in addition to a bag. In some embodiments, other accessories of various types, configurations, materials and mounting techniques may be used. These could be embedded, mounted on rails, attached via clips, be magnetic or inserted into the device.

In some embodiments, sides of the device may have a concave shape, and the sides of the device may define an interior portion. The concave shape may provide advantages. For example, because most power tools, such as drills, have cylindrical bodies, the concave shape is most practical for providing a friction hold with the most surface area. As another example, because of the concave shape, the device may include at least one lip at the bottom of the sides that may prevent the device from sliding vertically off the top of the tool. In some embodiments, the device will not have sides having a concave shape, but the device may nevertheless have a protrusion or lip along a bottom edge to secure the device on the tool.

In some embodiments, air vents may be formed into the side of the device. In some embodiments, slits cut into or formed in the sides or top of the device may provide airflow to and from the tool. Such a feature may be helpful when the device is attached to a tool having air vents or slits along the body to cool motors contained in the tool. In some embodiments, slits, rails, or holes may be made in the side or sides of the device. In some embodiments, the slits, rails, or holes may be used for hanging accessories such as the bags, wrist straps, or hooks for storage.

Aspects of the present disclosure may provide various advantages over the prior art. For example, the device may include one or more magnets that may be used to firmly affix a plurality of screws, bits, or other accessories to the device. Yet still, neither the device, nor the accessories attached to the device, are fixed to a particular tool, as the device may be easily removed and placed on a different tool or placed in a storage location. Yet still, in some embodiments, the device may include various other features that improve the utility of both the device and the tool to which the device is attached, such as lights that may be controlled by a button (as opposed to only being activated when the device is active), levels, and storage features.

Additionally, unlike some attachments, the device need not be attached to a user, and the device need not be permanently adhered to a particular tool. Yet still, in some embodiments, a concave shape of the device may provide a secure hold on a tool having a cylindrical body. Yet still, a clamping mechanism of the tool may be easy to use (e.g., without any additional tools) and may provide a secure hold on the tool while also being flexible enough to allow the device to accommodate tools of various shapes and sizes. As is apparent, these are only some of the advantages provided by the aspects of the present disclosure.

Furthermore, the present disclosure is to be considered as an exemplification of the disclosure and is not intended to limit the disclosure to the specific embodiments illustrated by the figures or description below. Examples are given herein to help illustrate the intended purpose and application of the disclosure. The present disclosure will now be described by referencing the appended figures representing preferred embodiments.

FIG. 1 illustrates a front view of an example embodiment of the device 100. In the example shown, the device 100 includes a housing 102 defining an interior portion 101, a first housing component 103, a second housing component 105, a first housing side 107, a second housing side 109, a protrusion 106, and an LED 110.

In some embodiments, the housing 102 may be formed by a plurality of components, such as the first housing component 103 and the second housing component 105. To form the housing 102, The first housing component 103 and the second housing component 105 may, in some embodiments, be coupled to one another via a clamping mechanism, as is illustrated and described below in connection with FIGS. 3-5 and 9-10. Alternatively, in some embodiments the housing 102 may be made of a single component (e.g., the first housing component 103 and the second housing component 105 may be a single component or they may be fixed to one another).

In some embodiments, the housing 102 may be made of plastic or other material that can provide a tensioned hold against the body of a tool, such as a power drill. In some embodiments, the material of the housing 102 may have some flexural modulus. Such flexibility may allow the device 100 to hold securely to the tool while still being removable from the tool. In examples, the material of the housing 102 may be stiff enough to provide a proper structural hold, flexible enough to fit over a portion of the tool, and uniform enough to provide a platform for storing one or more tool accessories. In some embodiments, the material of the housing 102 is based on polycarbonate or another polymer-based material.

As shown in the example of FIG. 1, the housing 102 may define an interior portion 101. In examples, the interior portion 101 may be empty when the device 100 is not attached to a tool. In some embodiments, the top of the interior portion 101 may be defined by an underside of the housing 102, the sides of the interior portion 101 may be defined by sides of the housing 102, and the bottom of the interior portion 101 may be open. As illustrated in the example of FIG. 1, the open bottom portion defined by the housing 102 may lead into the interior portion 101. The open bottom portion may be configured to receive a portion of a tool into the interior portion 101. In some embodiments, the open bottom portion may also include materials or components. For example, the open bottom portion may include a flap, cover, extensions from the sides of the housing 102, or other material.

In the example of FIG. 1, the sides of the housing 102 include the side 107 and the side 109. In some embodiments, one or more of the sides may be curved. For example, as shown in the example of FIG. 1, the sides 107 and 109 are concave. In other embodiments, the sides may be shaped in other ways. For example, the sides may be formed to fit a portion of tool with which the device 100 is to be coupled. In some embodiments, one or more of the sides of the housing 102 may include a lip or protrusion at a lower edge of one or more of the sides. For example, the side 107 may include a protrusion 106 at a bottom edge. In some embodiments, the protrusion 106 is a natural extension of a concave curvature on the inside of the side 107. In some embodiments, the protrusion 106 extends into the interior portion 101. The protrusion 106 may, in some instances, secure a portion of a tool in the interior portion 101.

FIG. 1 further illustrates an example LED 110. In some embodiments, the LED 110 may be embedded into material of the housing 102. In the example shown, the LED 110 is disposed in the middle of the front face of the device 100. However, depending on the embodiment, the LED 110 may be off-centered or disposed on another exterior side of the device 100. In some embodiments, the device 100 may have multiple LEDs in the front face, or on other sides as well. Additionally, in some embodiments, the device 100 may include a light other than an LED (e.g., a condensed fluorescent light or another type of light). Although represented as being embedded in the housing 102 of the device 100, the LED 110 could be designed to be removable or swappable with other accessories.

In some embodiments, a user may turn on or turn off the LED 110 without using a tool to which the device 100 is attached. For example, the user need not use an electrical component of a tool to use the LED 110, as the LED 110 may be coupled to a battery or other power source of the device 100.

Figure 2:
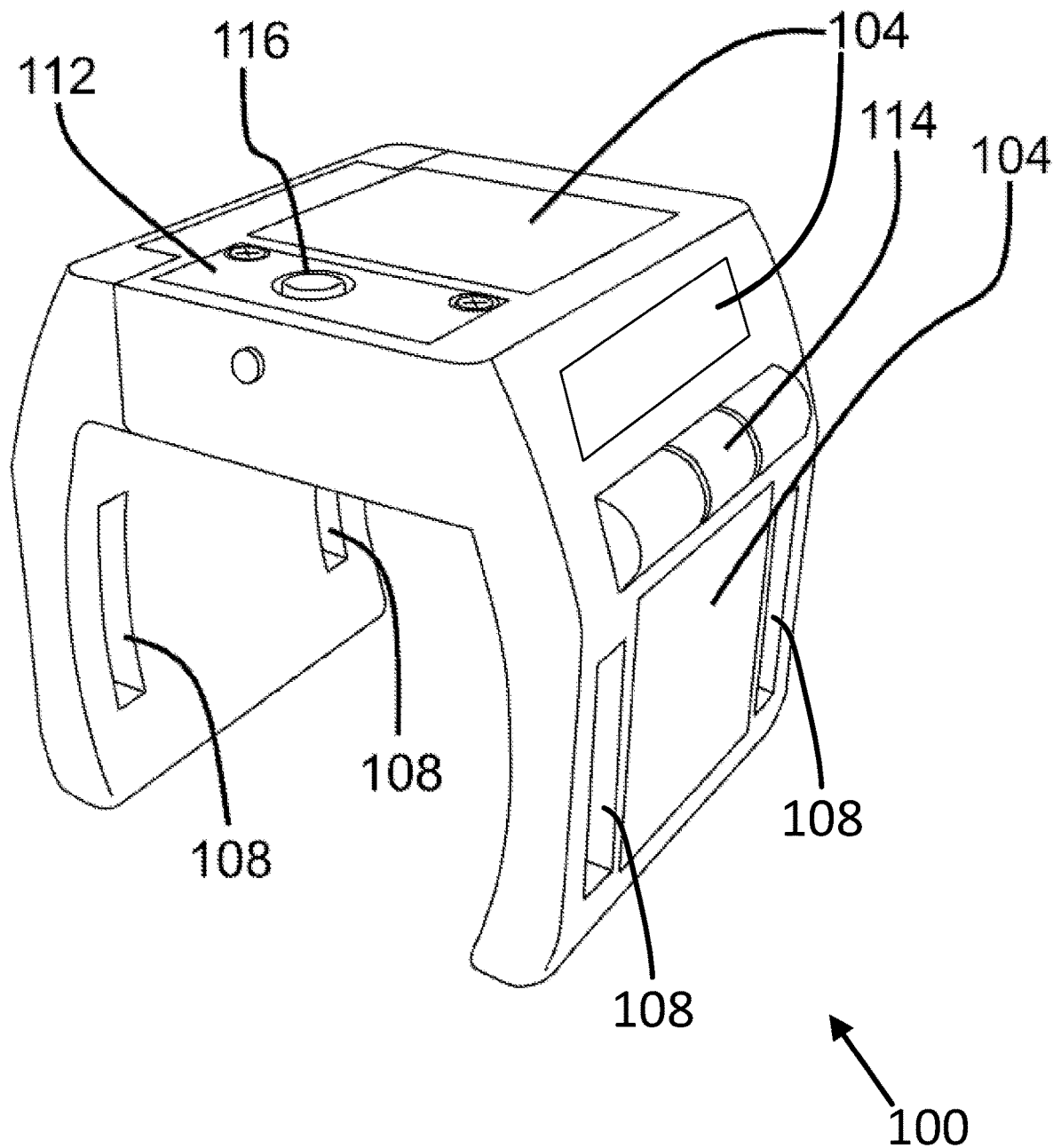
FIG. 2 illustrates a perspective view of the device of FIG. 1.

FIG. 2 illustrates a perspective view of the device 100. In the example shown, the device 100 includes magnets 104, slits 108, an electrical compartment 112, and a button 116. In the example of FIG. 1B, the device 100 may also include aspects illustrated and described above in connection with FIG. 1A.

In the example shown, the device 100 includes a plurality of magnets 104 that may affix accessories to the device 100. For example, the magnets 104 may affix accessories having ferrous material to one or more exterior surfaces of the device 100. Depending on the embodiment, the exterior surfaces to which accessories may be attached include one or more of an exterior top, an exterior front, an exterior back, or one or more exterior sides. In some embodiments, one or more of the magnets 104 may be embedded in material of the housing 102.

In the example shown, a surface of each of the magnets 104 is exposed on a surface of the device 100. However, in some embodiments, one or more of the magnets may be embedded within the housing 102 and may be covered by the housing 102 or by another material, such as leather, paint, plastic spray, cloth, or another material. In the example shown, the magnets 104 are illustrated on the top and one exterior side of the device 100. However, one or more of the magnets 104 could be on any, all or no sides of the device 100.

These magnets 104 may include a single or multiple magnets on each side. In some embodiments, the device 100 may include—instead of or in addition to magnets—another accessory fastening mechanism. For example, the device 100 may include Velcro, sticky surfaces, a suction surface, rails, cups, baskets, bags, or another mechanism for storing an accessory of a tool or a piece used by a tool.

As shown in the example of FIG. 2, the device 100 may include slits 108 defined by the housing 102. In some embodiments, the slits 108 may be in one or more sides of the housing 102. The slits 108 may be open space that provides airflow between the interior portion 101 and an exterior of the device 100. In some embodiments, the slits 108 may provide room for air flow to a tool's electric motor for cooling purposes.

The number and placement of the slits 108 as shown in the example of FIG. 2 should not be construed to limit where these slits 108 could be placed. There could be any number of them in a variety of orientations or shapes throughout the device 100. In some embodiments, the slits 108 may also be used for holding straps, bags, or other accessories to the device 100. Further, one or more of the slits 108 may also be configured to provide a means to mount the device 100—and a tool coupled to the device 100—to something else, such as a storage rack, a hook, a protrusion from a wall or ceiling, or another possible storage space.

As shown in the example of FIG. 2, the device 100 may include an electrical compartment 112. In the example shown, a surface of the electrical compartment 112 is disposed on a top face of the device 100. In examples, at least a portion of the electrical compartment may be embedded in the housing 102. In some embodiments, the electrical compartment 112 may be configured to receive one or more batteries. In the example shown, the electrical compartment 112 is illustrated as a self-contained and serviceable part of the device 100. For example, a user may remove a cover of the electrical compartment 112 to access an electrical component of the electrical compartment (e.g., to replace a battery or access a charging port).

In some embodiments, the electrical compartment 112 may be permanently embedded in material of the housing 102. If, for example, the electrical compartment 112 is powered by a USB rechargeable battery with a charging port exposed on the housing 102, then there may not be a need for the electrical compartment 112 to be serviceable. Thus, the serviceability of the electrical compartment 112 is only one example of a variety of possible implementations. The illustrated location of the electrical compartment 112 on a top of the device 100 is also one of many possible locations. For example, the electrical compartment 112 could also be on an interior or exterior of one of the sides of the device 100, an interior of the top of the device 100, or on a front or back of the device 100, among other options.

As shown in the example of FIG. 2, the device 100 may include a button that may be coupled to aspects of the electrical compartment 112. The button 116 may include one or more of a plurality of possible uses. For example, an actuation of the button (e.g., a short press, a long press, a double click, etc.) may activate a component of the device 100, such as the LED 110, an accessory fastening mechanism like a magnet, or another component. The location of the button 116 may vary depending on the embodiment. For example, the button 116 may be integrated into the electrical compartment 112, thereby simplifying, in some instances, a manufacturing process of aspects of the device 100.

However, in some embodiment, the button 116 may be separate from the electrical compartment 112. For example, the button 116 may be placed in any number of locations throughout the device 100. Although a single button 116 is illustrated, multiple buttons could be implemented. Although a push button type of button 116 is illustrated, the button could also be a slide, rocker, or other type of button.

As shown in the example of FIG. 2, the device 100 may include a level 114. In example shown, the level 114 is illustrated as a horizontal bubble level. However, the level 114 may take the form of any number of different types of levels. Such level types may include, but are not limited to, bullseye levels, bubble levels, and laser levels. The location of the level 114 may vary depending on the embodiment. For example, the location of the level 114 may depend at least in part on one or more of the following: the level's function, other accessories of the device 100, the material of the device 100, or the number of levels used. Although a single level 114 is illustrated, more than one level 114 could be implemented in some embodiments of the device 100.

In addition to the features illustrated in the example of FIG. 2, the device 100 may also include other features in some embodiments. For example, the device 100 may include a speaker, a laser, a storage compartment, or other features. Furthermore, features of the device 100 may, depending on the feature and the embodiment, be permanent or temporary. For example, in some embodiments, a user may select which features to use with the device 100 (e.g., a user may remove a level and add a laser, or vice-versa, a user may install multiple lights, a user may cover or open a slit, a user may add or remove a magnet or a sticky or suction surface, etc.). As a result, a user may, in some embodiments, customize the device 100 according to the user's preferences or according to the needs of a project.

Figure 3:
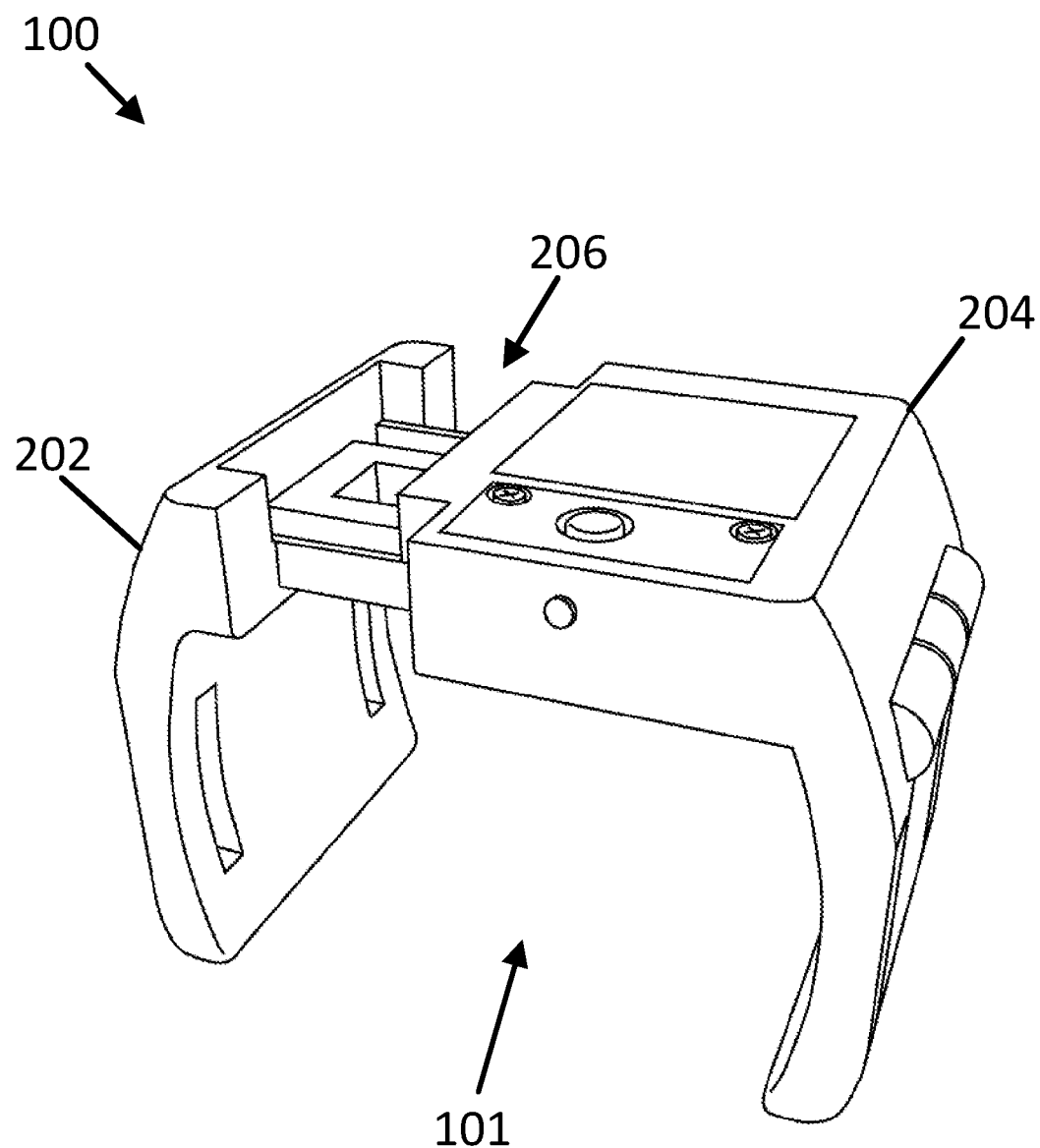
FIG. 3 illustrates another perspective view of the device of FIG. 1, including a clamping mechanism of the device.
Figure 4:
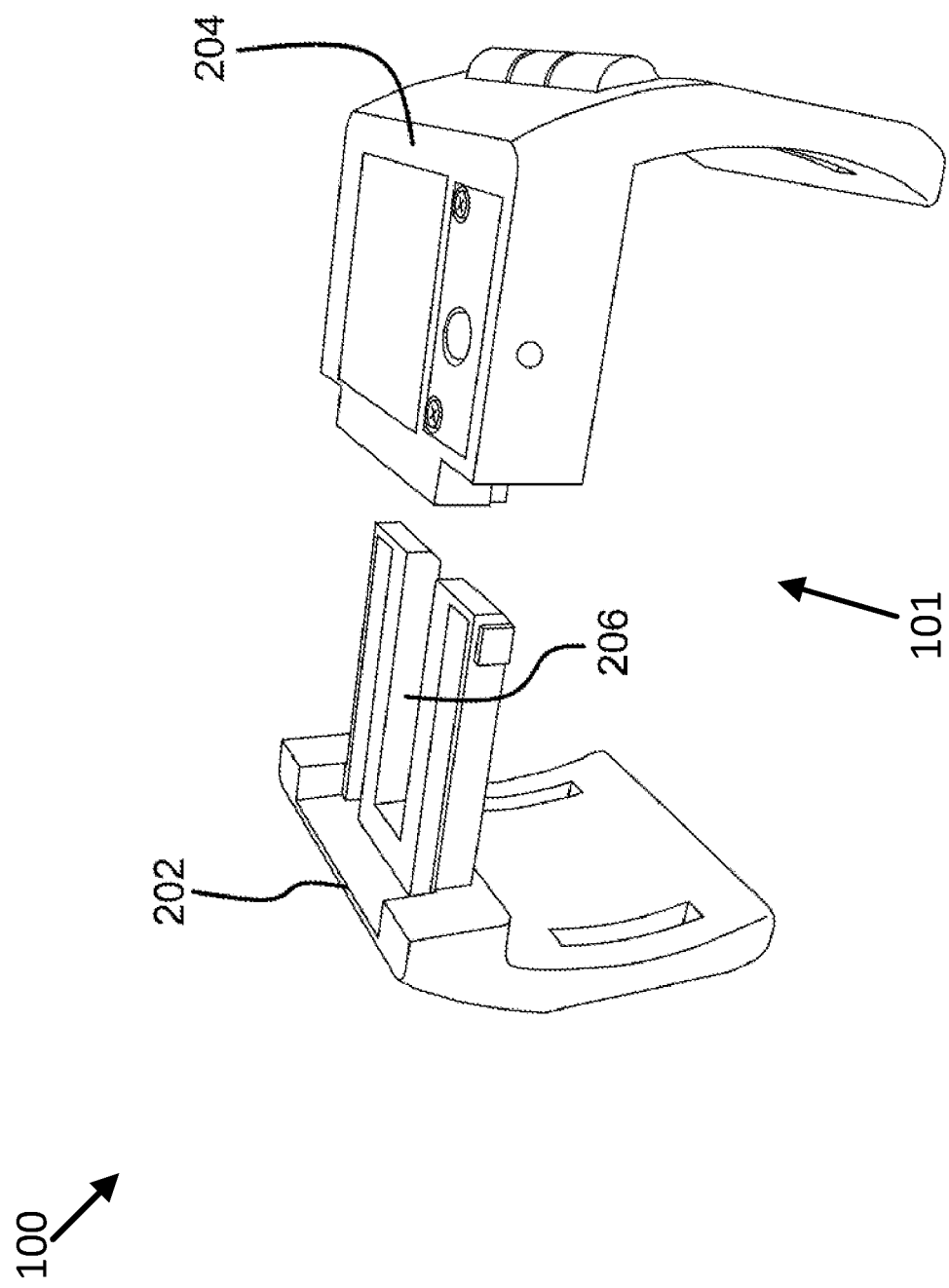
FIG. 4 illustrates another perspective view of the device of FIG. 1, including a disengaged clamping mechanism of the device.
Figure 5:
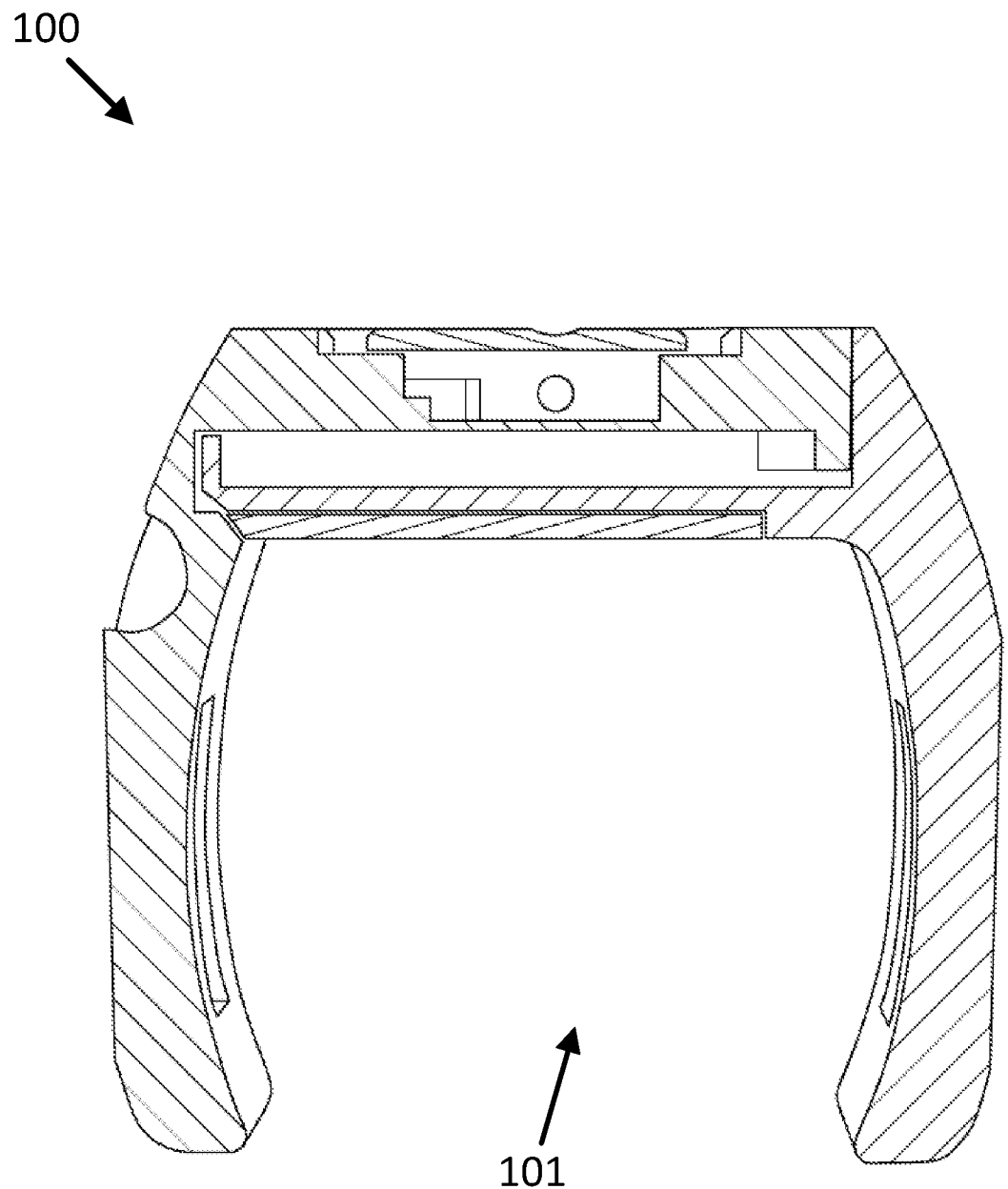
FIG. 5 illustrates another perspective view of the device of FIG. 1, including a clamping mechanism of the device.

In the example of FIGS. 3-5, the device 100 includes a clamping extension 202, a main body 204, and a clamping mechanism 206. The clamping extension 202 and the main body 204 may be examples of the components 103 and 105, which are further described above in connection with FIG. 1. For example, the clamping extension 202 and the main body 204 may form the housing 102. Furthermore, the clamping extension 202 and the main body 204 may form the clamping mechanism 206.

The clamping mechanism 206 may provide a mechanism for the device 100 to attach to a tool. For example, the clamping mechanism 206 may cause the housing 102 to clamp onto a portion of a tool disposed in the interior portion 101. In some embodiments, when the clamping mechanism is opened, or extended, the interior portion 101 may expand. For example, as the clamping mechanism opens, or extends, the clamping extension 202 and the main body 204 may become further apart, thereby expanding the size of the interior portion 101. Similarly, as the clamping mechanism closes, or is retracted, the clamping extension and the main body may become closer together, thereby contracting the size of the interior portion 101. In some embodiments, a user applying a force to the device 100 may cause the clamping mechanism to open or close.

In some embodiments, the clamping mechanism 206 may be partially open. For example, as shown in the example of FIG. 3, the clamping mechanism 206 is partially extended. As shown in the example of FIG. 4, the clamping mechanism 206 is disengaged, causing the clamping extension 202 and the main body 204 to not be in contact. As shown in the example of FIG. 5, the clamping mechanism 206 is fully closed. In some embodiments, the degree to which the clamping mechanism is open may depend on the size of the portion of the tool to which the device 100 is attached. For example, the clamping mechanism 206 may at least partially open, so that the open bottom portion of the housing 102 is large enough to receive the portion of the tool. Then the clamping mechanism may partially close, thereby causing the interior portion 101 to contract, so that the housing 102 clamps onto the portion of the tool in the interior portion 101.

In some embodiments, the clamping mechanism 206 may include a tension-producing part. For example, the clamping mechanism 206 may include one or more springs. In an example, the one or more springs may be contained within the housing 102. For example, one or more springs may be contained within the clamping extension 202 or the main body 204. In some embodiments, the one or more springs may be metal or plastic. However, there may be a number of different spring or spring-like configurations that may be utilized. An example of a clamping mechanism that may use a spring is further illustrated and described below in connection with FIG. 10.

Furthermore, in addition to clamping mechanisms that utilize springs, there are other embodiments for the clamping mechanism. For example, as described above in connection with FIG. 1, the device 100 may consist of a single piece, and the clamping mechanism may be based on material properties of aspects the housing 102, such as the material's flexibility and strength. As other examples, the clamping mechanism may use latches, levers, weights, bungees, or other components.

Figure 6:
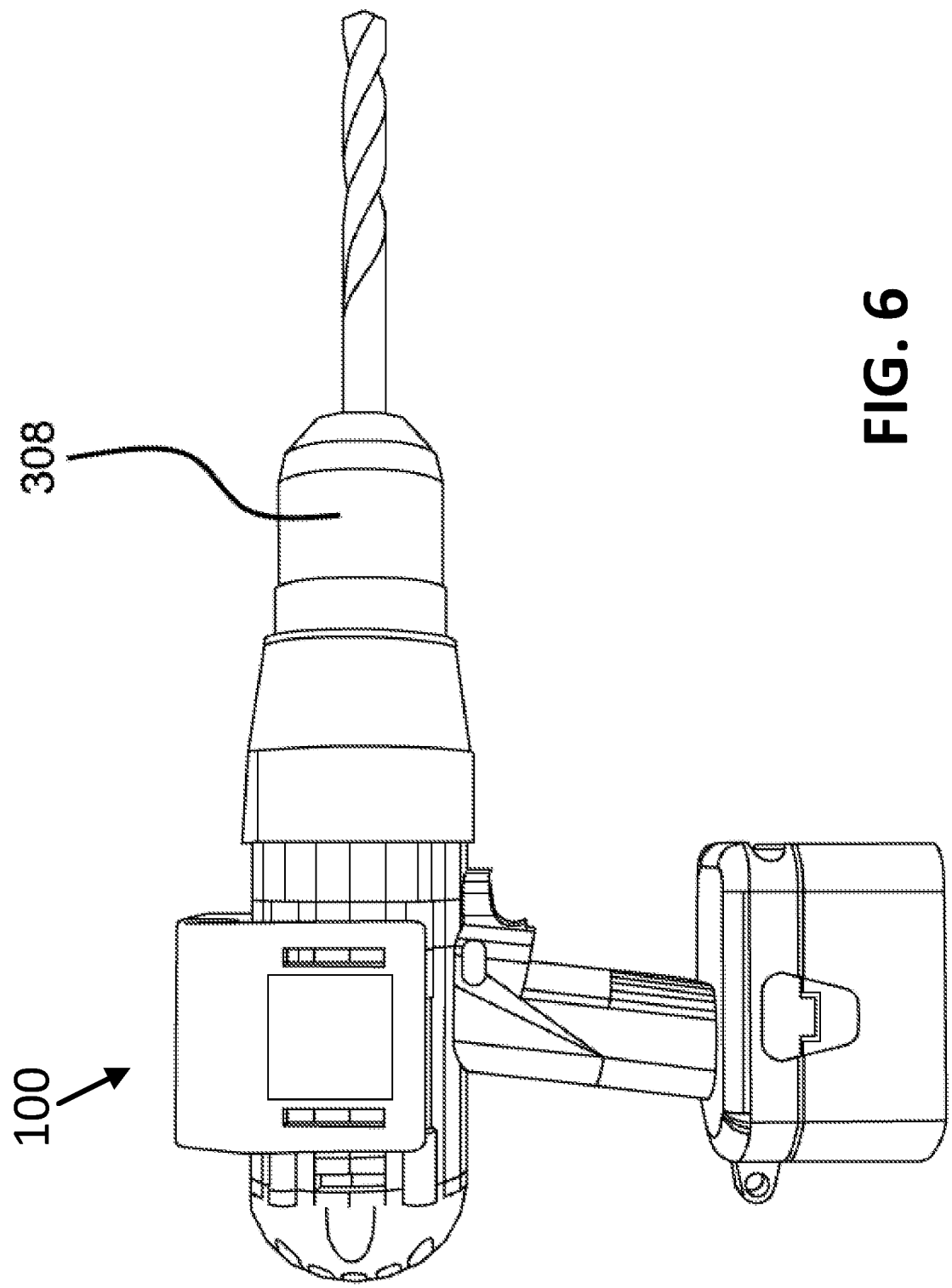
FIG. 6 illustrates a side view of an example application of the device of FIG. 1.
Figure 7:
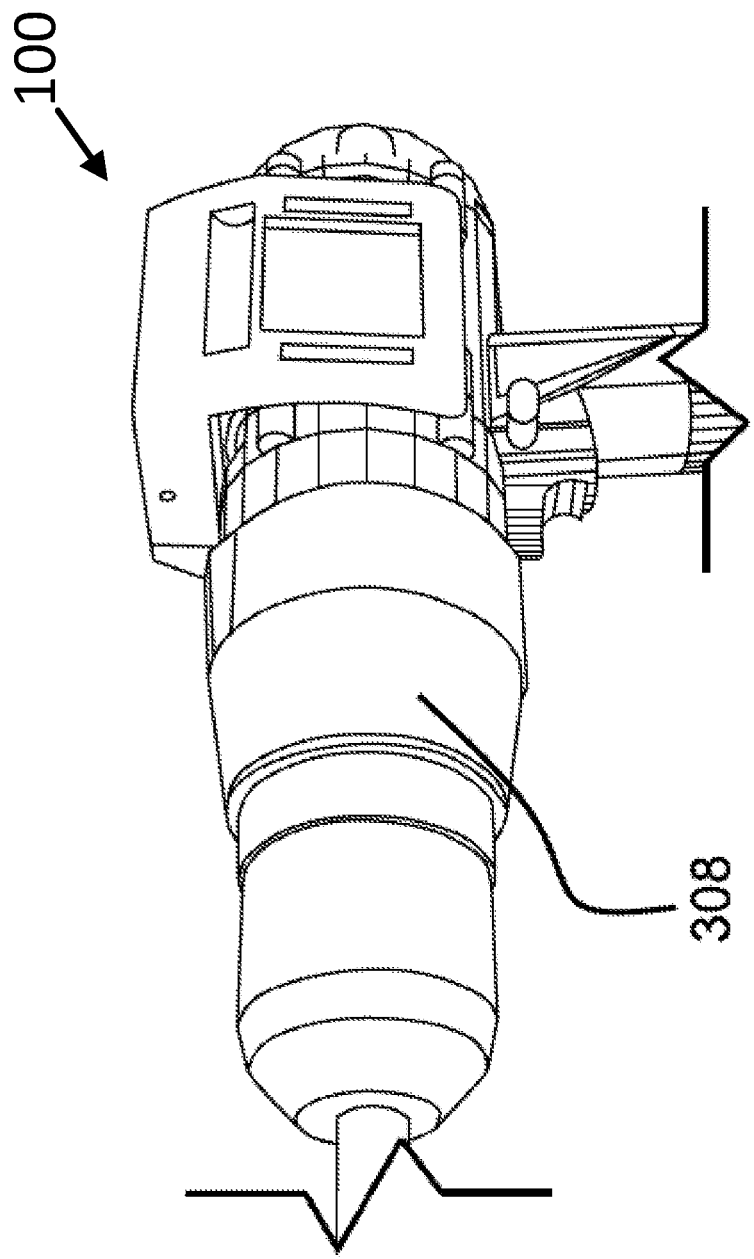
FIG. 7 illustrates an angled view of an example application of the device of FIG. 1.
Figure 8:
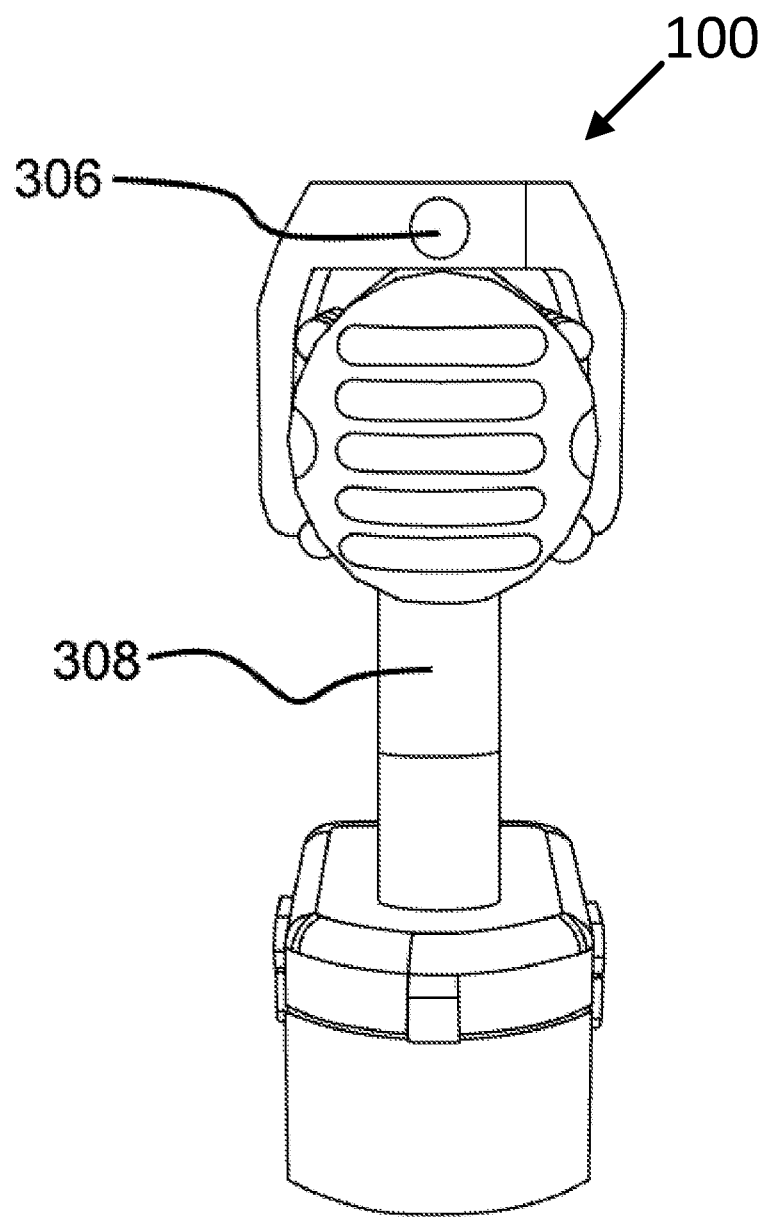
FIG. 8 illustrates a back view of an example application of the device of FIG. 1.

FIGS. 6-8 illustrate an example application of the device 100. FIG. 6 illustrates a side view, FIG. 7 illustrates an angled view, and FIG. 8 illustrates a back view.

In the examples of FIGS. 6-8, the device 100 is used with a tool 308. In the examples shown, the tool 308 is a power drill. As shown, the device 100 may attach to a back portion of the tool 308. However, depending on the type of tool and depending on the embodiment of the device 100, the device 100 may attach to another portion of the tool 308, such as a base or a front portion. Although a generic power drill is illustrated as the tool 308, it is but a representation of all the various tools—both powered and unpowered—that the device 100 may be attached to. For example, the device 100 may be configured to attach to a nail gun, driver, saw, flashlight, hammer drill, or other tool.

Additionally, in some embodiments, the device 100 may be attached to a person's wrist, or to an article of clothing or equipment worn by a person. As is further illustrated and described below in connection with the FIGS. 11-12, the device 100 may, in some instances, store accessories for the tool to which the device 100 is attached. For example, if the tool is a drill, then the device 100 may store screws and drill bits, which may be attached to an accessory fastening mechanism of the device 100, such as a magnet.

As shown in the back view of the example of FIG. 8, the device 100 may include a bullseye level 306. In some embodiments, the bullseye level 306 may be mounted on a backside of the device 100. In some embodiments, the bullseye level 306 may be embedded in the housing 102 of the device 100. In some embodiments, the bullseye level 306 may be mounted on a different part of the device 100, or a level other than a bullseye level may be mounted to the device 100. Although one embodiments of the device 100 is illustrated in the FIGS. 6-8, other embodiments of the device 100 may be used in connection with a drill or other tool.

Figure 9:
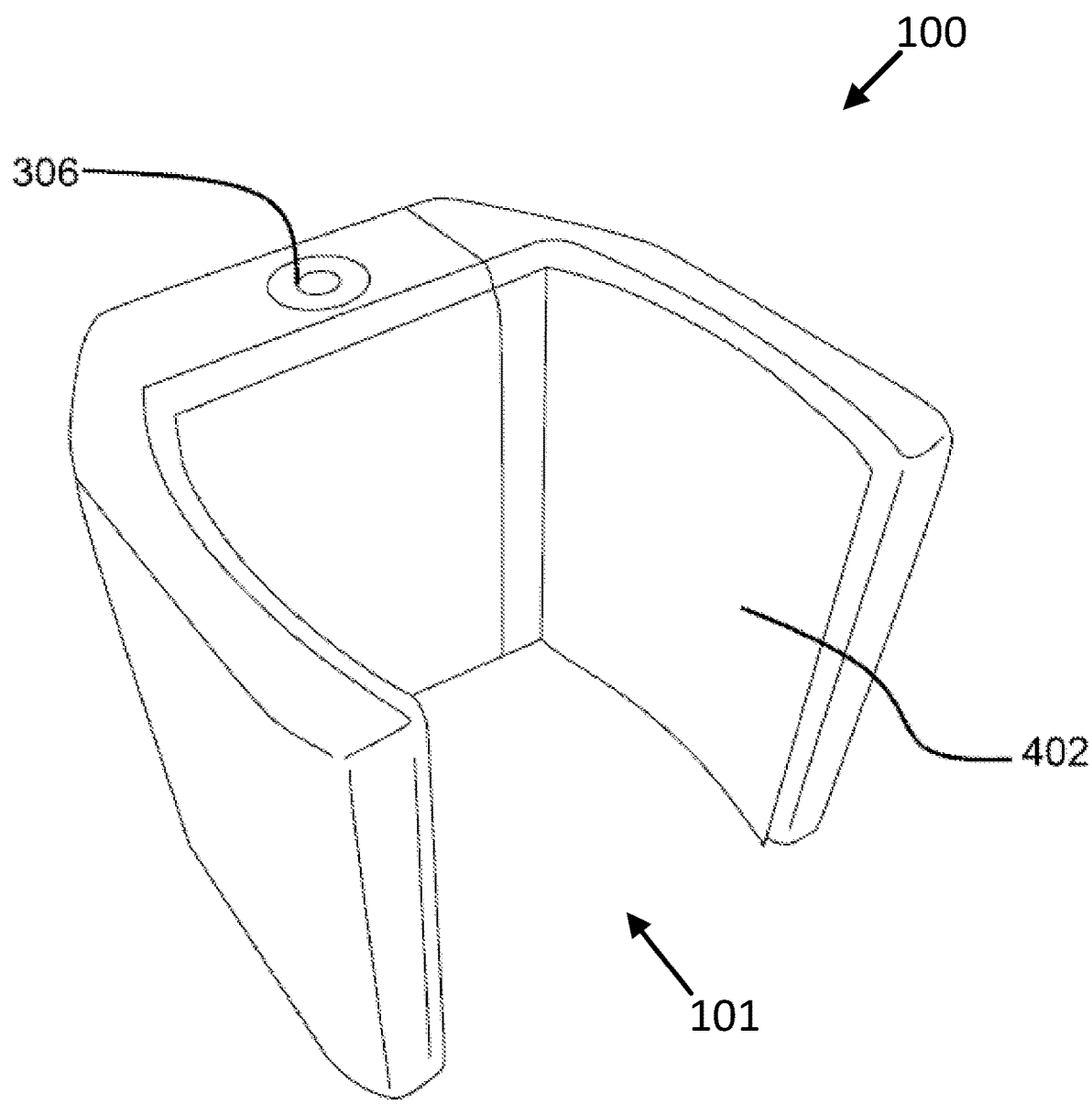
FIG. 9 illustrates another perspective view of the device of FIG. 1.

FIG. 9 illustrates an example of an under side and back side of the device 100, including the interior portion 101, the bullseye level 306, and an interior lining 402. In some embodiments, the interior lining 402 may be fixed to an interior of one or more sides of the housing 102. In some embodiments, the interior lining 402 may help to secure a portion of the tool in the interior portion 101. For example, the interior lining 402 may prevent the tool from slipping, sliding, or becoming misaligned.

Furthermore, the interior lining 402 may prevent the tool from inadvertently becoming detached from the device 100. In some embodiments, the interior lining 402 is made of rubber. In other embodiments, the interior lining may be made of other material. In some embodiments, the interior lining may cover less that all of the interior of one or more sides of the housing (e.g., the interior lining may only be present on a portion of the side). In some embodiments, the interior lining 402 may be removed or replaced.

Figure 10:
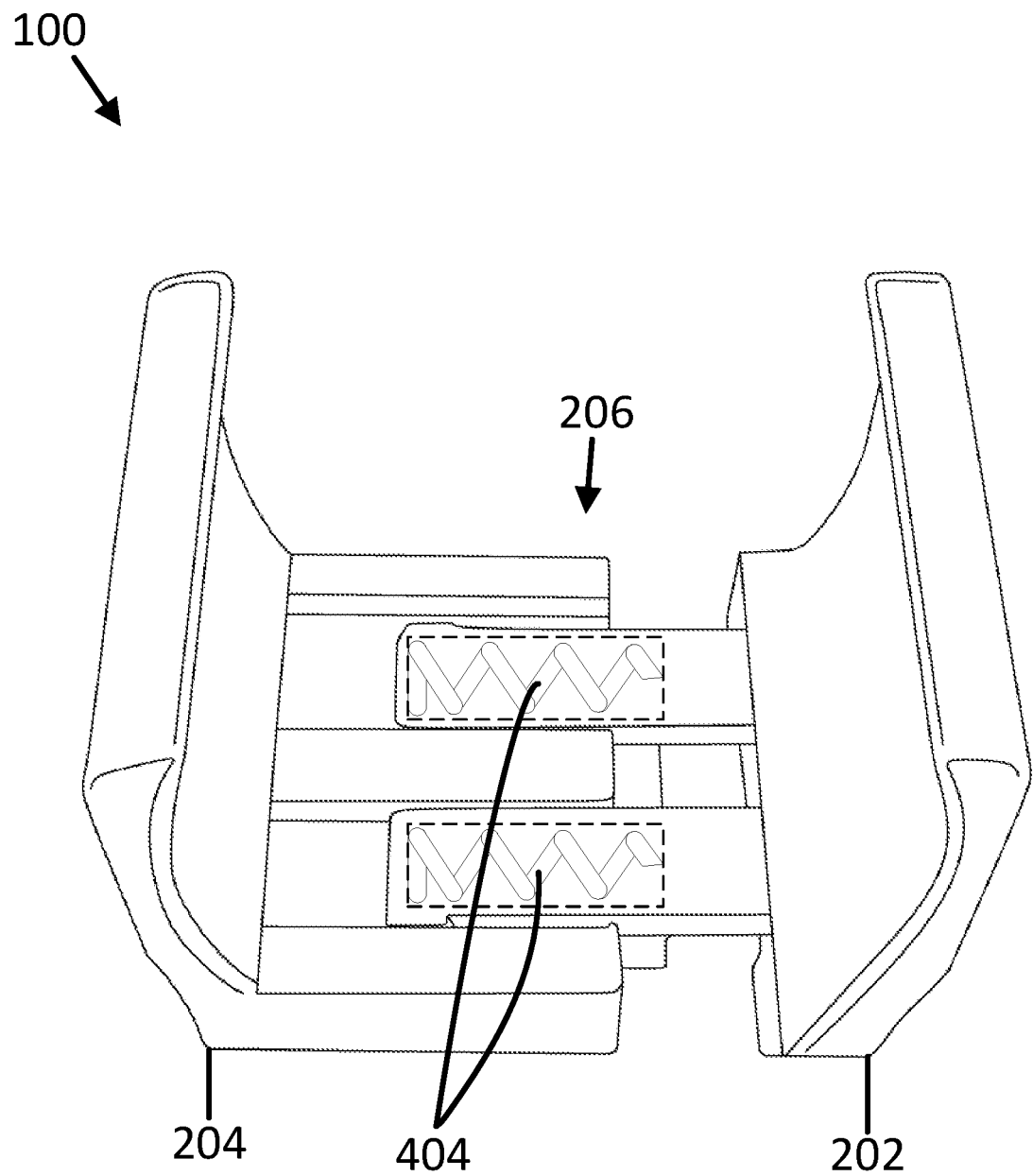
FIG. 10 illustrates another perspective view of the device of FIG. 1, including a clamping mechanism of the device.

FIG. 10 illustrates an under side of the device 100, the clamping extension 202, the main body 204, and the clamping mechanism 206. In the example shown, the clamping mechanism 206 may include one or more springs 404, as illustrated through a partial cross-section of the clamping mechanism 206. In the example shown, the clamping mechanism 206 is partially opened.

In some embodiments, the springs 404 may be housed within the clamping extension 202. In some embodiments, material of the clamping extension 202, or another component of the device 100, may cover the springs, so that they may, in some instances, be held in place and protected from interfering objects. In some embodiments, springs may be housed within the main body 204.

In the example shown, when the clamping mechanism is opened (e.g., by an external force pulling apart the housing 102), the springs 404 may compress or retract, causing the interior portion 101 to expand. As a result, the springs, when the clamping mechanism is open, store energy, such that when the external force is removed, the springs 404 may expand, thereby pulling the housing 102 closer together and causing the interior portion 101 to contract.

In some embodiments, the springs 404 may extend until the clamping mechanism is closed or until the sides of the device 100 are clamped onto a tool. The clamping mechanism 206 illustrated and described in the example of FIG. 10 may be only one of a plurality of possible clamping mechanisms that may be implemented by the device 100, as described above in connection with FIGS. 3-5.

Figure 11:
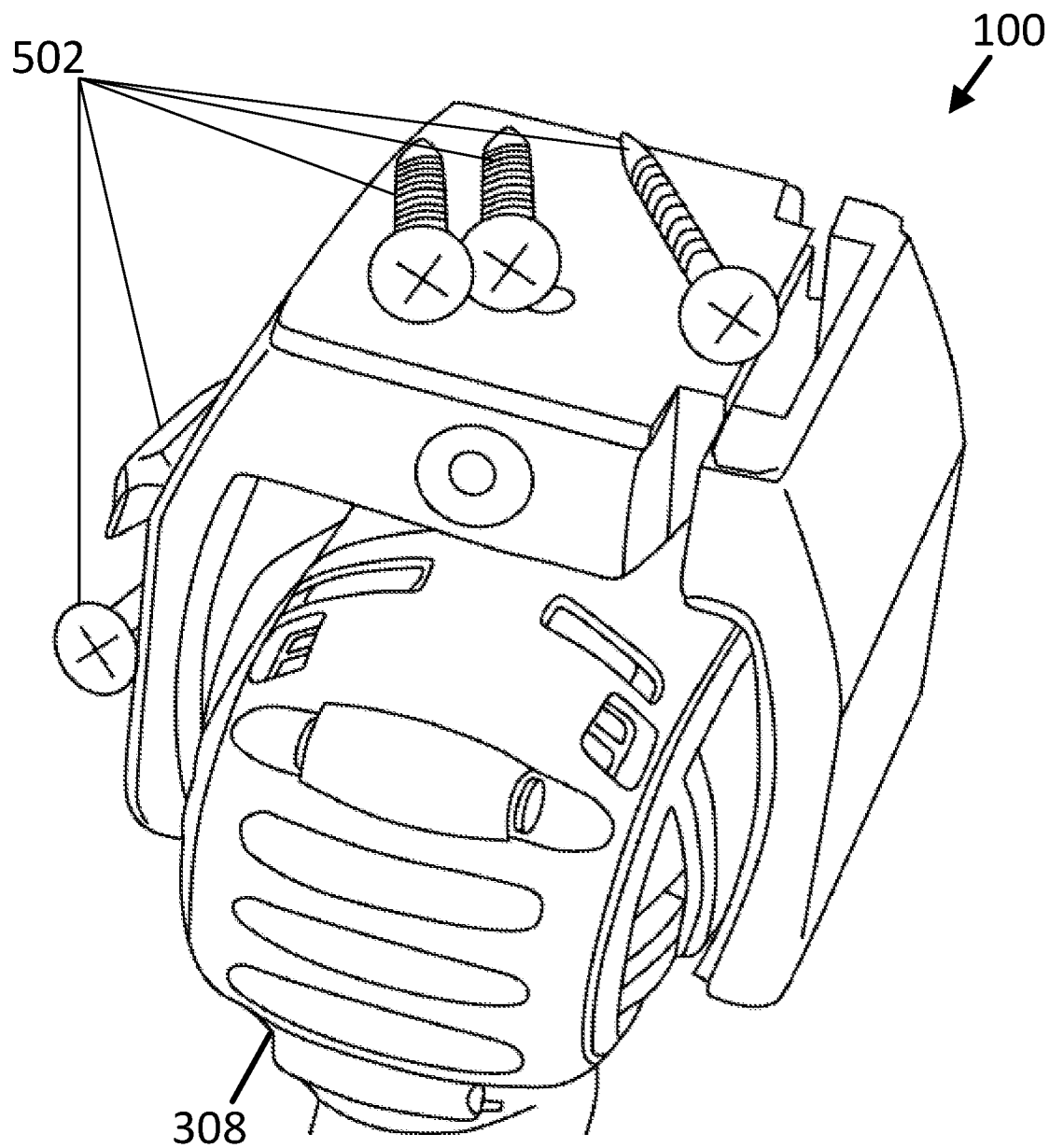
FIG. 11 illustrates an angled view of an example of the device of FIG. 1 affixing tool accessories.
Figure 12:
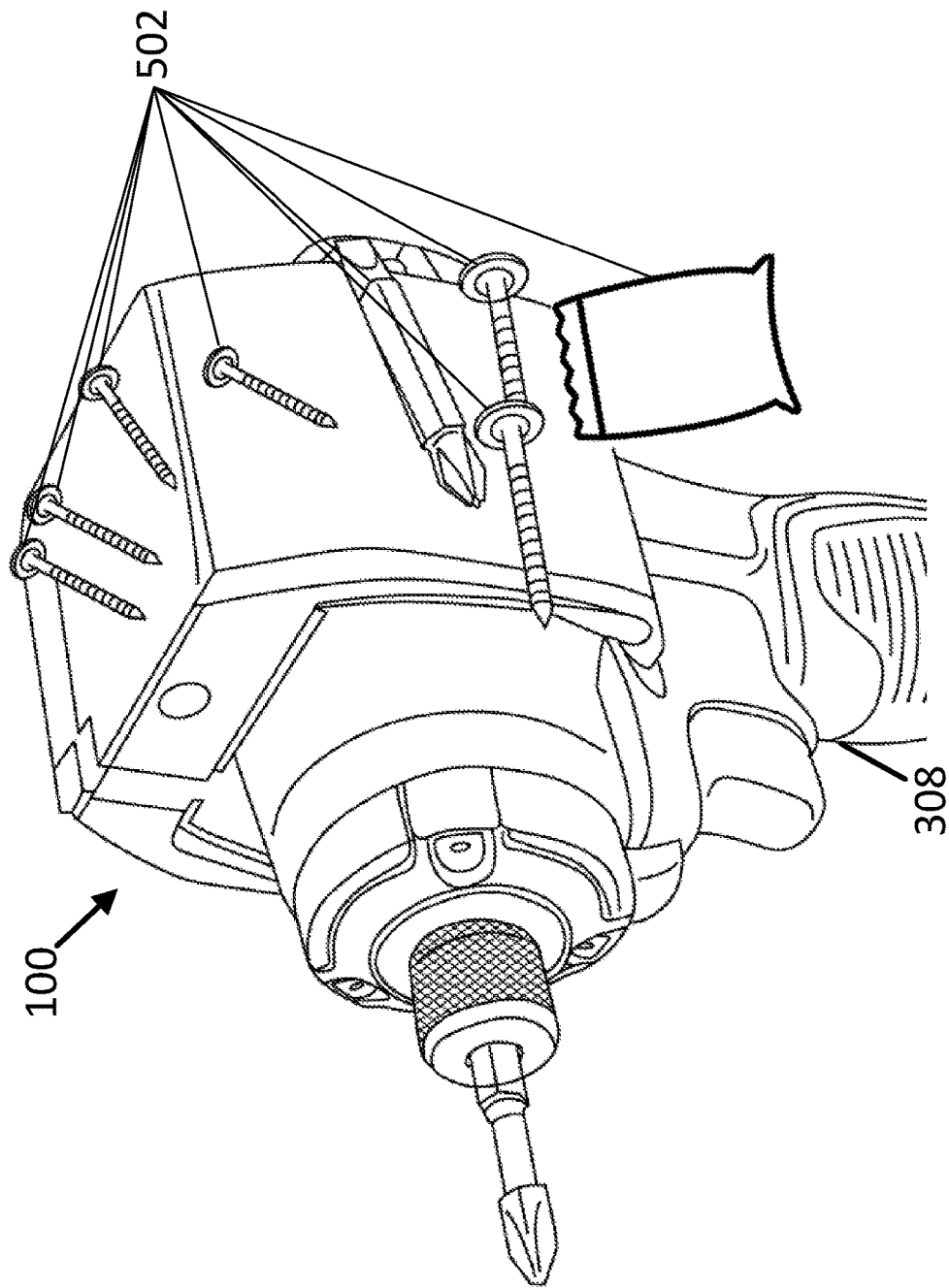
FIG. 12 illustrates another angled view of an example of the device of FIG. 1 affixing tool accessories.

FIGS. 11-12 illustrate example uses of the device 100. In the examples shown, the device 100 is attached to a tool 308 and accessories 502 are stored on and attached to the device 100. In the examples of FIGS. 5A-5B, the tool 308 is a drill. The accessories 502 may be pieces that may be used with the tool 308. In some embodiments, a user of the tool 308 may easily grab the accessories 502 from the device 100, store accessories 502 on the device 100, or swap out the accessories 502 for new accessories. The accessories 502 may include, but are not limited to, the following: screws, bits, nails, bolts, pins, washers, caps, plugs, straps, rope, or other pieces.

Furthermore, in some embodiments, the device 100 may include accessories that store other pieces. For example, the accessories 502 may include a bag having a ferrous metal that attaches to a magnet of the device 100. The bag may include, for example, pieces needed for a particular project or pieces that work with a particular tool.

As shown in the examples of FIGS. 11-12, the device 100 may include magnets that are attached to or embedded in the housing 102. In some embodiments, the magnets may provide the force to attach the accessories 502 to the device 100. In other embodiments, however, the device 100 may include other mechanisms for fastening accessories to the device 100, as described above in connection with FIG. 2.

Figure 13:
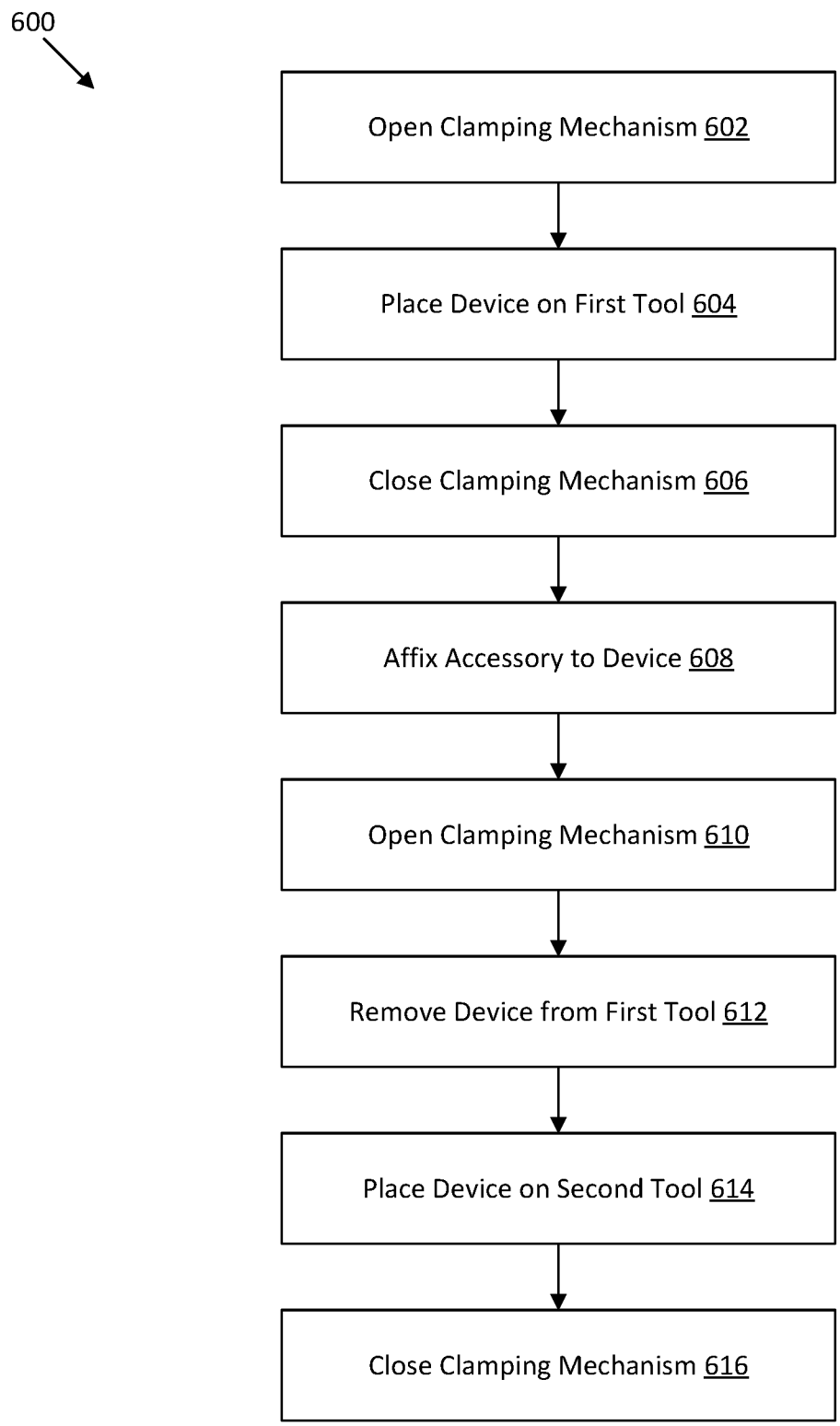
FIG. 13 is a flowchart of an example use of the device.

FIG. 13 is a flowchart of an example method 600 for using the device 100. In some embodiments, aspects of the method 600 may be performed by a human user of the device 100. Aspects of the method 600 illustrate how a user of the device 100 may move the device 100 from one tool to another while continuing to store accessories on the device 100.

As illustrated by the operation 602, the user may open a clamping mechanism of the device 100. For example, the user may pull on the housing 102 of the device 100 to cause a compression of the springs of the clamping mechanism and an expansion an interior portion of the device 100. Alternatively, the user may perform another action to open the clamping mechanism, depending on the embodiment of the device 100. Additionally, in some instances, the user need not fully open the clamping mechanism.

As illustrated by the operation 604, the user may place the device 100 on a first tool. For example, with the clamping mechanism at least partially open, the user may place the device 100 on a tool. As an example, by placing the device 100 on the first tool, at least a portion of the first tool may be within the interior portion 101 of the device 100.

As illustrated by the operation 606, the user may close the clamping mechanism. To do so, the user may, in some embodiments, release a part of the device on which the user exerted a force to open the clamping mechanism. As a result, the user may allow the clamping mechanism to close. In some embodiments, the user may actuate a lock, lever, or other mechanism to close the clamping mechanism. In some embodiments, closing the clamping mechanism may cause the interior portion of the device 100 to contract and to clamp onto the portion of the first tool within the interior portion 101.

As illustrated by the operation 608, the user may affix an accessory to the device 100. For example, the user may affix a screw, bit, or other accessory to an exterior of the device 100 by using an accessory fastening mechanism of the device 100, an example of which is illustrated and described above in connection with FIGS. 11-12. In some embodiments, the user may affix one or more accessories onto the device 100 prior to attaching the device 100 onto the tool.

As illustrated by the operation 610, the user may open the clamping mechanism. For example, the user may be finished using the first tool, and the user may desire to move the device 100 to a different tool. By opening the clamping mechanism, the user may release the first tool from a clamping force of the device 100. An example of opening the clamping mechanism is described above in connection with the operation 606.

As illustrated by the operation 612, the user may remove the device from the first tool. For example, because the clamping mechanism is at least partially open, an open bottom portion of the housing 102 may be sufficiently large so that the user may remove the device 100 from the first tool.

As illustrated by the operation 614, the user may place the device on a second tool. The second tool may be a different tool than the first tool, or the second tool may be the same tool as the first tool but at a later time. An example of placing the device 100 on a tool is described above in connection with the operation 604.

As illustrated by the operation 616, the user may close the clamping mechanism, thereby clamping the device 100 onto the second tool. An example of closing the clamping mechanism to attach the device 100 to a tool is described above in connection with the operation 606.

As a result of the method 600, the user may have transferred the device 100 from the first tool to the second tool. In some embodiments, the user may perform such a transfer in a matter of seconds (e.g., less than ten seconds). In some embodiments, the user need not use any tools to fix the device 100 to a tool, remove the device 100 from a tool, or to transfer the device 100 from one tool to another. Furthermore, in addition to the operations illustrated and described in connection with FIG. 13, a user may also perform other operations. For example, a user may remove an accessory from the device 100, use the first tool or second tool while the device 100 is attached, store the device 100 using a slit or feature of the device 100, store a tool using the device 100, or perform another operation.

While particular uses of the technology have been illustrated and discussed above, the disclosed technology can be used with a variety of processes in accordance with many examples of the technology. This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects e.g., operations, memory arrangements, etc. described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A device for storing a tool accessory, the device comprising:
   a housing defining an interior portion and including an open bottom portion, wherein the housing comprises a main body and a clamping extension, wherein the main body and clamping extension are configured to be completely separable from one another such that the main body and the clamping extension can be disengaged to have no physical contact;
   a clamping mechanism including at least one spring housed within the clamping extension that is configured to compress when the clamping mechanism is opened and expand when the clamping mechanism is closed;
   wherein the interior portion is defined at least in part by the clamping extension and the main body and is configured to receive, via the open bottom portion of the housing, a portion of a tool;
   wherein the clamping mechanism, when opened, causes the at least one spring to compress, causing the interior portion of the housing to expand by increasing distance between the clamping extension and the main body; and
   wherein the clamping mechanism, when closed, causes the spring to expand, pulling the clamping extension and the main body closer together causing the interior portion to contract and causing the device to clamp onto the portion of the tool; and
   a magnet attached to the housing, the magnet being configured to affix an accessory to an exterior surface of the device.

2. The device of claim 1, further comprising a second magnet attached to the housing, the second magnet being configured to affix a second accessory to a second exterior surface of the device.

3. The device of claim 2, further comprising a third magnet attached to the housing, the third magnet being configured to affix a third accessory to a third exterior surface of the device.

4. The device of claim 1, wherein a wall defining the interior portion is lined with rubber.

5. The device of claim 1, wherein the housing includes concave sides.

6. The device of claim 5,
   wherein the housing defines a slit in at least one of the concave sides; and
   wherein the housing includes a protrusion at a bottom of at least one of the concave sides, the protrusion extending into the interior portion.

7. The device of claim 1, further comprising a level affixed to a side of the housing.

8. The device of claim 1, further comprising a bullseye level affixed to a backside of the housing.

9. The device of claim 1, further comprising:
   a light; and
   a button coupled to the light;
   wherein the button is disposed on an exterior of the device; and
   wherein an actuation of the button causes the light to turn on or turn off.

10. The device of claim 1, wherein the tool is a drill.

11. The device of claim 1, wherein the accessory is one or more of a screw or a bit.

12. A device for affixing and storing tool accessories, the device comprising:
    curved sides defining at least part of an interior portion of the device, wherein the curved sides comprise a main body and a clamping extension, wherein the main body and the clamping extension are configured to be completely separable from one another such that the main body and the clamping extension can be disengaged to have no physical contact;
    an open bottom portion leading to the interior portion;
    a clamping mechanism including at least one spring housed within the clamping extension that is configured to compress when the clamping mechanism is opened and expand when the clamping mechanism is closed;
    a first magnet configured to affix at least one of the tool accessories to an exterior top of the device; and
    a second magnet configured to affix at least one of the tool accessories to an exterior side of the device;
    wherein opening the clamping mechanism causes the at least one spring to compress, causing the interior portion and open bottom portion to expand by increasing distance between the clamping extension and the main body; and
    wherein closing the clamping mechanism causes the at least one spring to expand, pulling the clamping extension and the main body closer together causing the interior portion to contract and causing the device to clamp onto a portion of a tool.

13. The device of claim 12, further comprising a level affixed to an exterior of a housing of the device.

14. The device of claim 12, further comprising a light controlled by a button exposed on an exterior of a housing of the device.

* * * * *